(12) United States Patent
Sakakura et al.

(10) Patent No.: US 8,301,199 B2
(45) Date of Patent: Oct. 30, 2012

(54) MOBILE APPARATUS (75) Inventors: Hitoshi Sakakura, Ome (JP); Junichi Ehara, Ome (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 354 days.

(21) Appl. No.: 12/390,536

(22) Filed: Feb. 23, 2009

(65) Prior Publication Data

US 2009/0318196 A1    Dec. 24, 2009

(30) Foreign Application Priority Data

Jun. 20, 2008   (JP) ................................ P2008-161947

(51) Int. Cl.
H04M 1/00 (2006.01)
(52) U.S. Cl. .......................................... 455/566; 341/22
(58) Field of Classification Search ............... 455/550.1; 341/20–23; 345/173
See application file for complete search history.

(56) References Cited

U.S. PATENT DOCUMENTS

| | | | | |
|---|---|---|---|---|
| 6,487,424 | B1 * | 11/2002 | Kraft et al. ..................... | 455/566 |
| 6,636,162 | B1 * | 10/2003 | Kushler et al. .................. | 341/28 |
| 7,626,516 | B2 * | 12/2009 | Griffin et al. ................... | 341/22 |
| 2003/0184451 | A1 * | 10/2003 | Li .................................. | 341/22 |
| 2006/0019715 | A1 * | 1/2006 | Jin ................................ | 455/566 |
| 2007/0046641 | A1 * | 3/2007 | Lim .............................. | 345/173 |
| 2007/0136688 | A1 * | 6/2007 | Mirkin et al. ................. | 715/816 |
| 2007/0290892 | A1 * | 12/2007 | Fux et al. ....................... | 341/22 |
| 2008/0088487 | A1 * | 4/2008 | Li .................................. | 341/22 |

FOREIGN PATENT DOCUMENTS

| | | |
|---|---|---|
| JP | 11-196451 A | 7/1999 |
| JP | 2003-196009 A | 7/2003 |
| JP | 2007-140827 A | 6/2007 |
| JP | 2007140827 A * | 6/2007 |

OTHER PUBLICATIONS

Japanese Office Action dated Nov. 8, 2011 as received in related application No. JP 2008-161947.

* cited by examiner

*Primary Examiner* — Shawki S Ismail
*Assistant Examiner* — Crystal L Hammond
(74) *Attorney, Agent, or Firm* — Maschoff Gilmore & Israelsen (57) ABSTRACT There is provided a mobile apparatus including: an input module including operating keys; a storage module configured to store a correspondence between a combination of a first operation and a second operation and a corresponding character, the second operation being an operation subsequent to the first operation, the first operation being an operation at a first operating key from among the operating keys, the second operation being an operation at a second operating key from among the operating keys; an extraction module configured to extract the character based on the first and the second operating keys referring to the correspondence; and a display module including a first display area; wherein the display module is configured to display the character extracted by the extraction module in the first display area.

5 Claims, 7 Drawing Sheets

| | | | | | SECOND PRESS KEY | | | | | |
|---|---|---|---|---|---|---|---|---|---|---|
| | 1 | 2 | 3 | 4 | 5 | 6 | 7 | 8 | 9 | 0 |
| 1 | α | β | γ | δ | ε | | | | | |
| 2 | ζ | η | θ | ι | κ | | | | | |
| 3 | λ | μ | ν | ξ | ο | | | | | |
| 4 | π | ρ | σ | τ | υ | | | | | |
| 5 | φ | χ | ψ | ω | | | | | | |
| 6 | ? | ! | % | $ | # | | | | | |
| 7 | °C | + | = | ; | : | | | | | |
| 8 | & | ( | ) | ` | ´ | | | | | |
| 9 | ' | " | _ | _ | — | | | | | |
| 0 | _ | Л | И | П | М | | | | | |

(FIRST PRESS KEY — rows)

FIG. 6

| FIRST PRESS KEY | SECOND PRESS KEY | USER-REGISTERED FIXED PHRASE |
|---|---|---|
| 1 | 6 | HAVE A NICE DAY |
| 1 | 7 | GOOD MORNING |
| 1 | 8 | GOOD AFTERNOON |
| 1 | 9 | GOOD EVENING |
| 1 | 0 | GOOD NIGHT |
| 2 | 6 | USER-DEFINED PHRASE 1 |
| 2 | 7 | USER-DEFINED PHRASE 2 |
| 2 | 8 | USER-DEFINED PHRASE 3 |
| 2 | 9 | USER-DEFINED PHRASE 4 |
| 2 | 0 | USER-DEFINED PHRASE 5 |
| 3 | | |
| ... | ... | ... |
| 9 | 6 | USER-DEFINED PHRASE 36 |
| 9 | 7 | USER-DEFINED PHRASE 37 |
| 9 | 8 | USER-DEFINED PHRASE 38 |
| 9 | 9 | USER-DEFINED PHRASE 39 |
| 9 | 0 | USER-DEFINED PHRASE 40 |

MOBILE APPARATUS

The entire disclosure of Japanese Patent Application No. 2008-161947 filed on Jun. 20, 2008, including specification, claims, drawings and abstract is incorporated herein by reference in its entirety.

BACKGROUND

1. Field of the Invention

One aspect of the present invention relates to a mobile apparatus, in particular, to a mobile apparatus equipped with operating keys used for inputting characters or symbols.

2. Description of the Related Art

In recent years, a mobile apparatus, such as a mobile phone, has various functions including: an address book function, a mail function through a network, such as Internet, a browser function for reading Web pages, and the like, besides a simple communication function by telephone call.

In particular, a composition function for writing provided in the mobile apparatus is increasingly used to write relatively long composition including symbols, such as phrases from diaries on Internet, called blogs. Accordingly, in order to improve operationality in writing such compositions including symbols, there is suggested a mobile apparatus in which toggle input can be performed by using operating keys provided in the mobile apparatus, or a mobile apparatus in which a user can operate two slide-type input units by both hands to perform matrix input.

Hitherto, many efforts have been made to achieve fast character input on the mobile apparatus and to allow the user to input characters and symbols with the number of presses of keys as small as possible. Although a character can be input fast to some extent, in order to input a character string including a plurality of components, such as characters or symbols, it is necessary to select a prescribed fixed phrase on a submenu screen. In addition, in order to input a character string, a large number of presses of keys are needed. For this reason, it is difficult to achieve fast character input.

SUMMARY

According to one aspect of the invention, there is provided a mobile apparatus including: an input module including a plurality of operating keys; a storage module configured to store a correspondence between a combination of a first operation and a second operation and a corresponding character, the second operation being an operation subsequent to the first operation, the first operation being an operation at a first operating key from among the plurality of operating keys, the second operation being an operation at a second operating key from among the plurality of operating keys; an extraction module configured to extract the character to be input, based on operations at the input module referring to the correspondence; and a display module including a first display area; wherein the display module is configured to display the character extracted by the extraction module in the first display area.

BRIEF DESCRIPTION OF THE DRAWINGS

Embodiment may be described in detail with reference to the accompanying drawings, in which.

DETAILED DESCRIPTION OF THE EMBODIMENTS

Figure 1A:
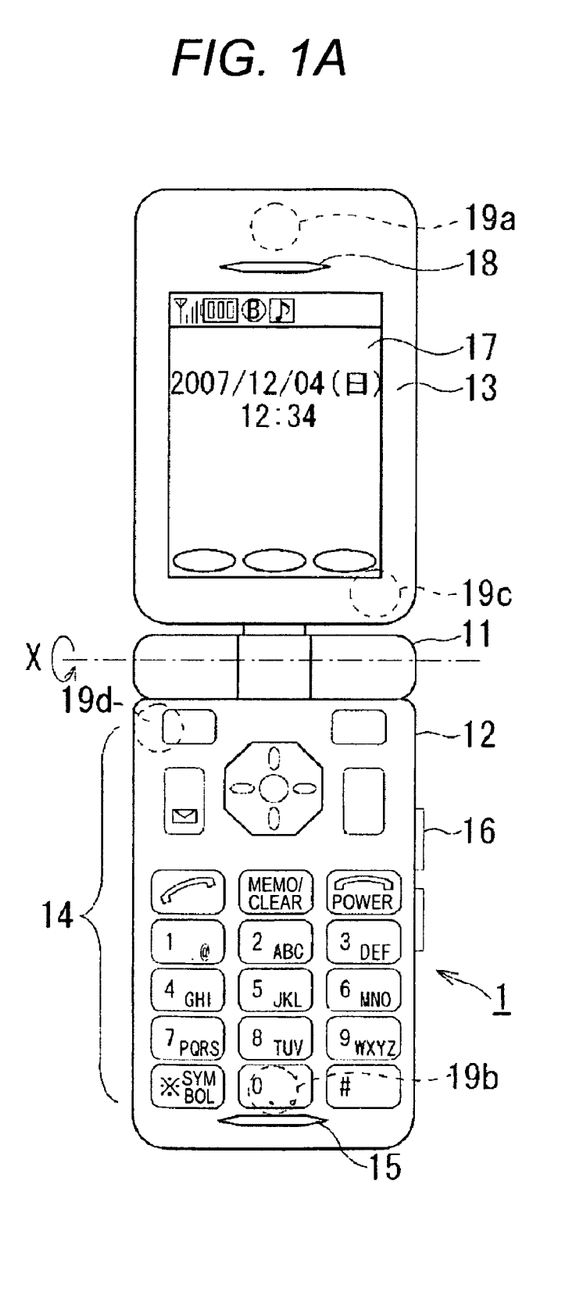
FIGS. 1A and 1B are exemplary diagrams showing the appearance configuration of a mobile phone that can be applied as a mobile apparatus according to the embodiment.
Figure 1B:
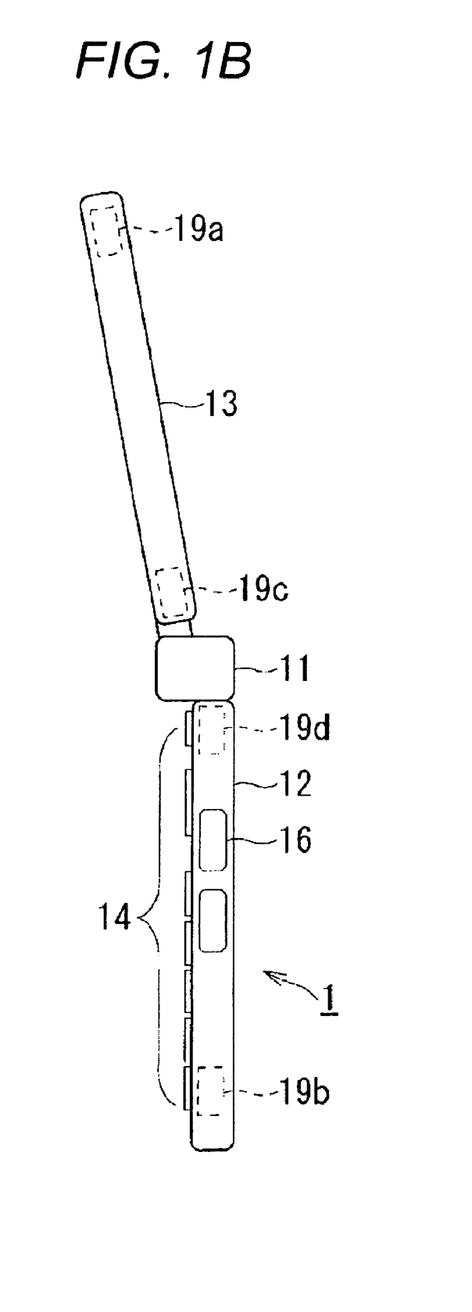

An embodiment of the invention will now be described with reference to the drawings. FIGS. 1A and 1B show the appearance configuration of a mobile phone 1 that can be applied as a mobile apparatus according to the invention. FIG. 1A shows the appearance configuration of the mobile phone 1 in a state where it is unfolded at 180 degrees as viewed from the front face. FIG. 1B shows the appearance configuration of the mobile phone 1 in a state where it is unfolded as viewed from the side face.

As shown in FIGS. 1A and 1B, in the mobile phone 1, a first casing 12 and a second casing 13 are hinged by a hinge 11 at its central portion. The mobile phone 1 is formed to be foldable in a direction of an arrow X through the hinge 11. An antenna (an antenna 31 in FIG. 3 described below) for transmission/reception is provided at a position in the mobile phone 1. With the internal antenna, the mobile phone 1 transmits and receives an electric wave to and from a base station (not shown).

On a surface of the first casing 12, operating keys 14, such as numeric keys of "0" to "9", a call key, a redial key, an end/power key, a clear key, an electronic mail key, and the like are provided. Various instructions can be input by using the operating keys 14.

At an upper portion of the first casing 12, a directional key and an enter key are also provided as operating keys 14. A user operates the directional key in a vertical or horizontal direction, thereby moving a cursor in the vertical or horizontal direction. Specifically, various operations, such as a scroll operation of a directory or an electronic mail displayed on a main display 17 provided in a second casing 13, a page rolling operation of a simplified homepage, and a forward operation of an image, are performed.

Various functions can be determined by pressing the enter key. For example, according to the operation of the directional key in the first casing 12 by the user, a desired telephone number is selected from among a plurality of telephone numbers of the directory displayed on the main display 17. Then, if the enter key is pressed in an inner direction of the first casing 12, the selected telephone number is determined, and a call request processing of the telephone number is performed.

In the first casing 12, an electronic mail key is provided on a left side of the directional key and the enter key. If the electronic mail key is pressed in the inner direction of the first casing 12, a mail transmission/reception function can be called. On a right side of the directional key and the enter key, a browser key is provided. If the browser key is pressed in the inner direction of the first casing 12, data of Web pages can be read.

In the first casing 12, a microphone 15 is also provided below the operating keys 14. With the microphone 15, a user's voice during calling is collected. In the first casing 12, a side key 16 is also provided to operate the mobile phone 1.

A battery pack (not shown) is provided at a rear face of the first casing 12. If the end/power key is put in an ON state, power is supplied to the individual circuits from the battery pack, such that the mobile phone 1 starts to operate.

Meanwhile, the main display 17 is provided at a front face of the second casing 13. On the main display 17, in addition to a reception state of an electric wave, a residual battery charge, the name or telephone number of a person to call or a telephone number registered in the directory, and a transmission history, the content of an electronic mail, a simplified homepage, an image captured by a Charge Coupled Device (CCD) camera (a CCD camera 20 of FIG. 2 described below), content data received from an external contents server (not shown), and content data stored in a memory card (a memory card 46 of FIG. 3 described below) can be displayed. A receiver 18 is provided at a position above the main display 17. With the receiver 18, the user can perform a voice call. A speaker (speaker 50 shown in FIG. 3), other than the receiver 18, serving as a voice output unit is provided at a predetermined position of the mobile phone 1.

Magnetic sensors 19a, 19b, 19c, and 19d are provided at positions of the first casing 12 and the second casing 13 so as to detect the state of the mobile phone 1. The main display 17 may be an organic EL display or a liquid crystal display.

Figure 2A:
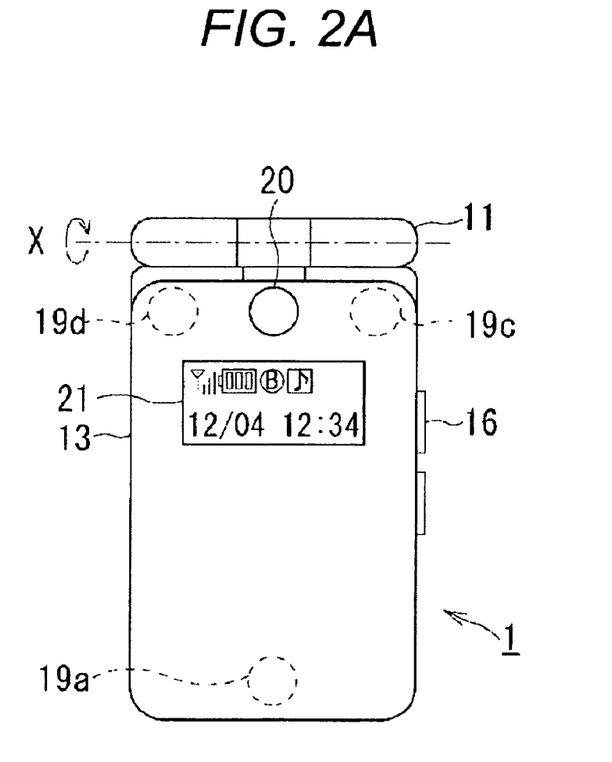
FIGS. 2A and 2B are exemplary diagrams showing another appearance configuration of a mobile phone that can be applied as a mobile apparatus according to the embodiment.
Figure 2B:
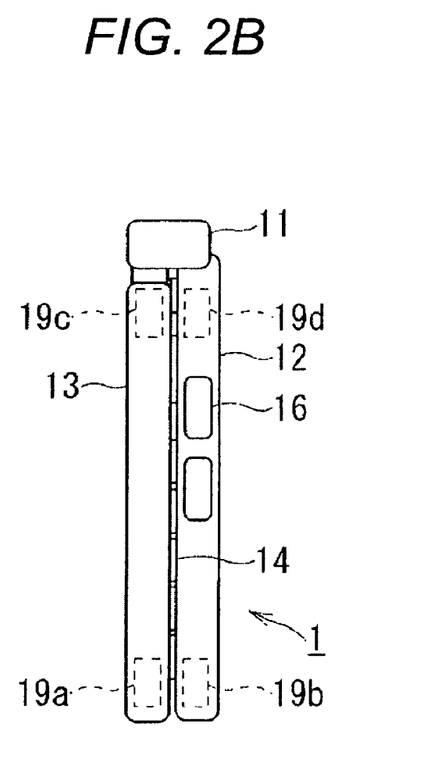

FIGS. 2A and 2B show the appearance configuration of the mobile phone 1 that can be applied as a mobile apparatus according to the invention. In FIGS. 2A and 2B, the mobile phone 1 is rotated in the direction of the arrow X from the state of the mobile phone 1 shown in FIGS. 1A and 1B. FIG. 2A shows the appearance configuration of the mobile phone 1 in a state where it is folded as viewed from the front face. FIG. 2B shows the appearance configuration of the mobile phone 1 in a state it is folded as viewed from the side face.

At an upper portion of the second casing 13, a CCD camera 20 is provided. With the CCD camera 20, a desired subject can be captured. A sub display 21 is provided below the CCD camera 20. On the sub display 21, an antenna pictograph indicating a current sensitivity level of the antenna, a battery pictograph indicating a current residual battery charge of the mobile phone 1, and a current time are displayed.

Figure 3:
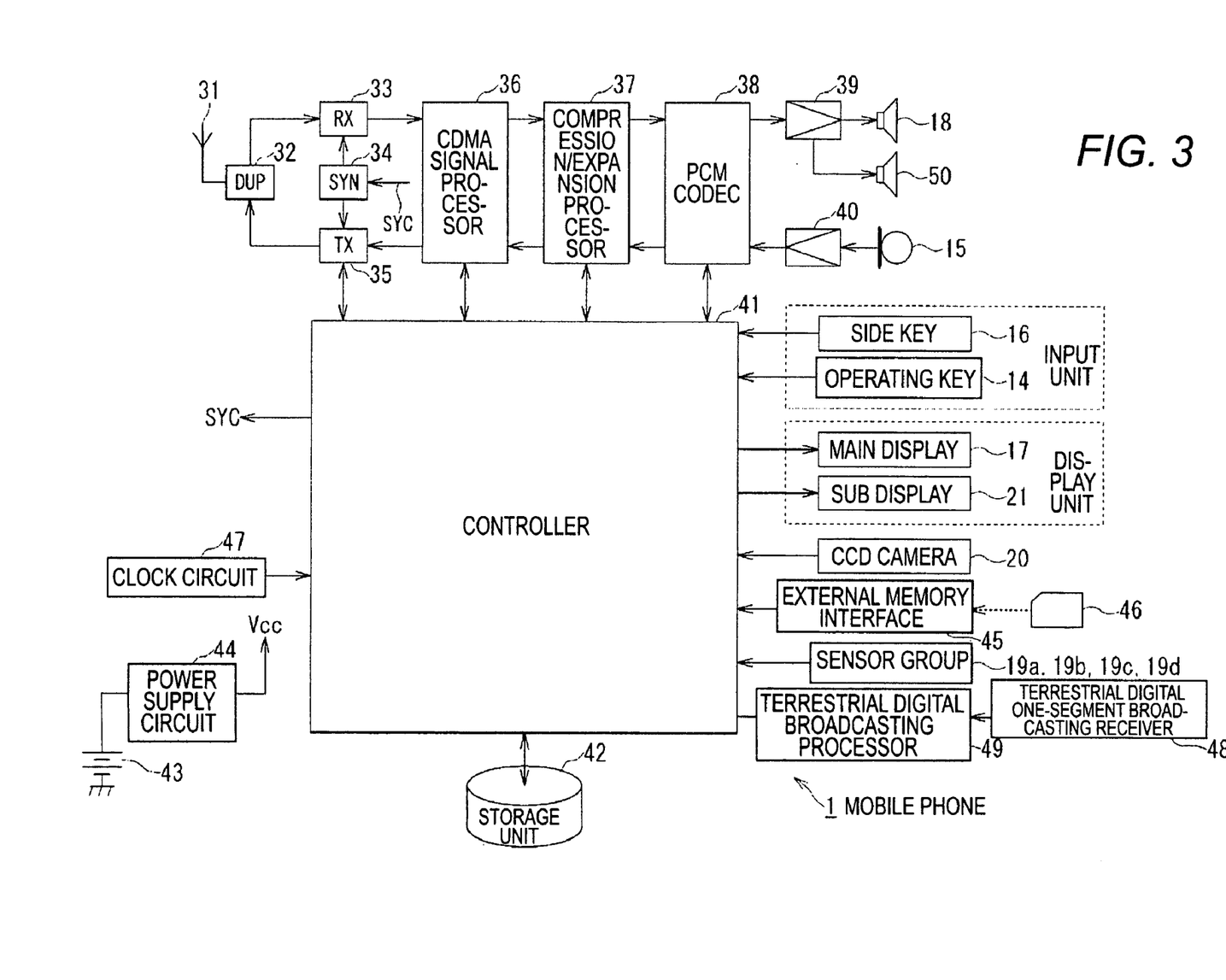
FIG. 3 is an exemplary block diagram showing the internal configuration of a mobile phone that can be applied as a mobile apparatus according to the embodiment.

FIG. 3 shows the internal configuration of the mobile phone 1 that can be applied as a mobile apparatus according to the invention. A radio signal transmitted from the base station (not shown) is received by an antenna 31 and is then input to a receiving circuit (RX) 33 through an antenna duplexer (DUP) 32. The receiving circuit 33 mixes the received radio signal with a local oscillation signal output from a frequency synthesizer (SYN) 34, and frequency-converts (down-converts) the radio signal into an intermediate frequency signal. Then, the receiving circuit 33 quadrature-demodulates the down-converted intermediate frequency signal and output a received baseband signal. The frequency of the local oscillation signal generated by the frequency synthesizer 34 is indicated by a control signal SYC output from a controller 41.

The received baseband signal from the receiving circuit 33 is input to a CDMA signal processor 36. The CDMA signal processor 36 has a RAKE receiver (not shown). The RAKE receiver despreads a plurality of paths included in the received baseband signal by using spread codes (that is, the same spread signal as a spread signal of a spread received signal). The signals of the despread paths are subject coherent Rake combination after their phases are adjusted. A sequence of data after Rake combination is subject to deinterleaving and channel decoding (error correction decoding), and binary data determination is then performed. In this way, received packet data having a predetermined transmission format is obtained. Received packet data is input to a compression/expansion processor 37.

The compression/expansion processor 37 is formed by a Digital Signal Processor (DSP). The compression/expansion processor 37 demultiplexes received packet data output from the CDMA signal processor 36 into media data by a multiplexer/demultiplexer (not shown), and decodes the demultiplexed media data. For example, in a voice call mode, audio data corresponding to a voice included in received packet data is decoded by a speech codec. Like a video phone mode, if motion image data is included in received packet data, motion image data is decoded by a video codec. If received packet data is downloaded content data, the downloaded content data is expanded and then output to the controller 41.

A digital audio signal obtained by decoding is supplied to a PCM codec 38. The PCM codec 38 PCM-decodes the digital audio signal output from the compression/expansion processor 37, and outputs an analog audio data signal after being PCM decoded to an incoming speech amplifier 39. The analog audio signal is amplified by the incoming speech amplifier 39 and then output by the receiver 18.

A digital motion image data decoded in the video codec by the compression/expansion processor 37 is input to the controller 41. The controller 41 controls the main display 17 to display a motion image based on the digital motion image signal output from the compression/expansion processor 37 through a video RAM (for example, VRAM) (not shown). The controller 41 may control the main display 17 to display motion image data captured by the CCD camera 20 through the video RAM (not shown), as well as received motion image data.

When received packet data is data of an electronic mail, the compression/expansion processor 37 supplies the electronic mail to the controller 41. The controller 41 stores the electronic mail from the compression/expansion processor 37 in a storage unit 42. Then, according to the operation of the operating keys 14 serving as an input module by the user, the controller 41 reads out the electronic mail stored in the storage unit 42, and controls the main display 17 to display the read electronic mail.

Meanwhile, in the voice call mode, a speech signal (analog audio signal) of a speaker (user) input to the microphone 15 is amplified to an appropriate level by an outgoing speech amplifier 40, and is then subject to PCM coding by the PCM codec 38. A digital audio signal after PCM coding is input to the compression/expansion processor 37. A motion image signal output from the CCD camera 20 is digitized by the controller 41 and is then input to the compression/expansion processor 37. An electronic mail created by the controller 41 in the form of text data is also input to the compression/expansion processor 37.

The compression/expansion processor 37 compresses and encodes the digital audio signal output from the PCM codec 38 to a signal of a format according to a predetermined transmission data rate. Accordingly, audio data is generated. In addition, the compression/expansion processor 37 compresses and encodes the digital motion image signal output from the controller 41 to generate motion image data. Then, the compression/expansion processor 37 multiplexes and packetizes audio data or motion image data by the multiplexer/demultiplexer (not shown) in accordance with a predetermined transmission format, and outputs transmission packet data after being packetized to the CDMA signal processor 36. When an electronic mail is output from the controller 41, the compression/expansion processor 37 also multiplexes the electronic mail to transmission packet data.

The CDMA signal processor 36 performs a spread spectrum processing on transmission packet data output from the compression/expansion processor 37 by using spread codes assigned to a transmission channel, and outputs an output signal after the spread spectrum processing to a transmitting circuit (TX) 35. The transmitting circuit 35 modulates the signal after the spread spectrum processing by using a digital modulation scheme, such as a Quadrature Phase Shift Keying (QPSK) scheme. The transmitting circuit 35 mixes a transmission signal after digital modulation with the local oscillation signal generated by the frequency synthesizer 34, and frequency-converts (up-converts) the transmission signal into a radio signal. Next, the transmitting circuit 35 high-frequency-amplifies the up-converted radio signal to a transmission power level designated by the controller 41. The high-frequency-amplified radio signal is supplied to the antenna 31 through the antenna duplexer 32, and is then transmitted from the antenna 31 to the base station (not shown).

The mobile phone 1 also has an external memory interface 45. The external memory interface 45 has a slot into which a memory card 46 is detachably inserted. The memory card 46 is a kind of a flash memory card, such as a NAND flash memory card or a NOR flash memory card. In the memory card 46, various kinds of data, such as image, sound, and music, can be rewritten and read out through a ten-pin terminal. The mobile phone 1 also has a clock circuit (timer) 47 that measures an accurate current time.

The controller 41 has a Central Processing Unit (CPU), a Read Only Memory (ROM), a Random Access Memory (RAM), and the like. The CPU performs various kinds of processing according to programs stored in the ROM or various application programs loaded on the ROM from the storage unit 42, generates various control signals, and supplies the control signals to the individual parts so as to perform overall control of the mobile phone 1. The RAM appropriately stores data required when the CPU performs various kinds of processing. If necessary, the CPU 41 may have one or a plurality of CPUs.

The storage unit 42 has, for example, an electrically rewritable or erasable flash memory or a Hard Disc Drive (HDD). The storage unit 42 stores various application programs, which are performed by the CPU of the controller 41, or various groups of data.

A power supply circuit 44 generates an operation power supply voltage Vcc based on the output of the battery 43 and outputs the operation power supply voltage Vcc to the individual circuits. A terrestrial digital one-segment broadcasting receiver 48 receives terrestrial digital one-segment broadcasting or terrestrial digital broadcasting from a broadcasting station (not shown), and supplies Transport Stream (TS) signals based on the received terrestrial digital one-segment broadcasting or terrestrial digital broadcasting to a terrestrial digital broadcasting processor 49. When the terrestrial digital one-segment broadcasting receiver 48 receives terrestrial digital one-segment broadcasting, the terrestrial digital broadcasting processor 49 separates Elementary Stream (ES) on sound data and video data from the TS signals based on the terrestrial digital one-segment broadcasting from the terrestrial digital one-segment broadcasting receiver 48. The terrestrial digital broadcasting processor 49 decodes separated sound data by a sound decoder (not shown) in the terrestrial digital broadcasting processor 49 according to a predetermined decoding scheme, and decodes separated video data by a video decoder (not shown) in the terrestrial digital broadcasting processor 49 according to a predetermined decoding scheme. The decoded digital sound signals and digital motion image signals are supplied to the control unit 41.

Figure 4:
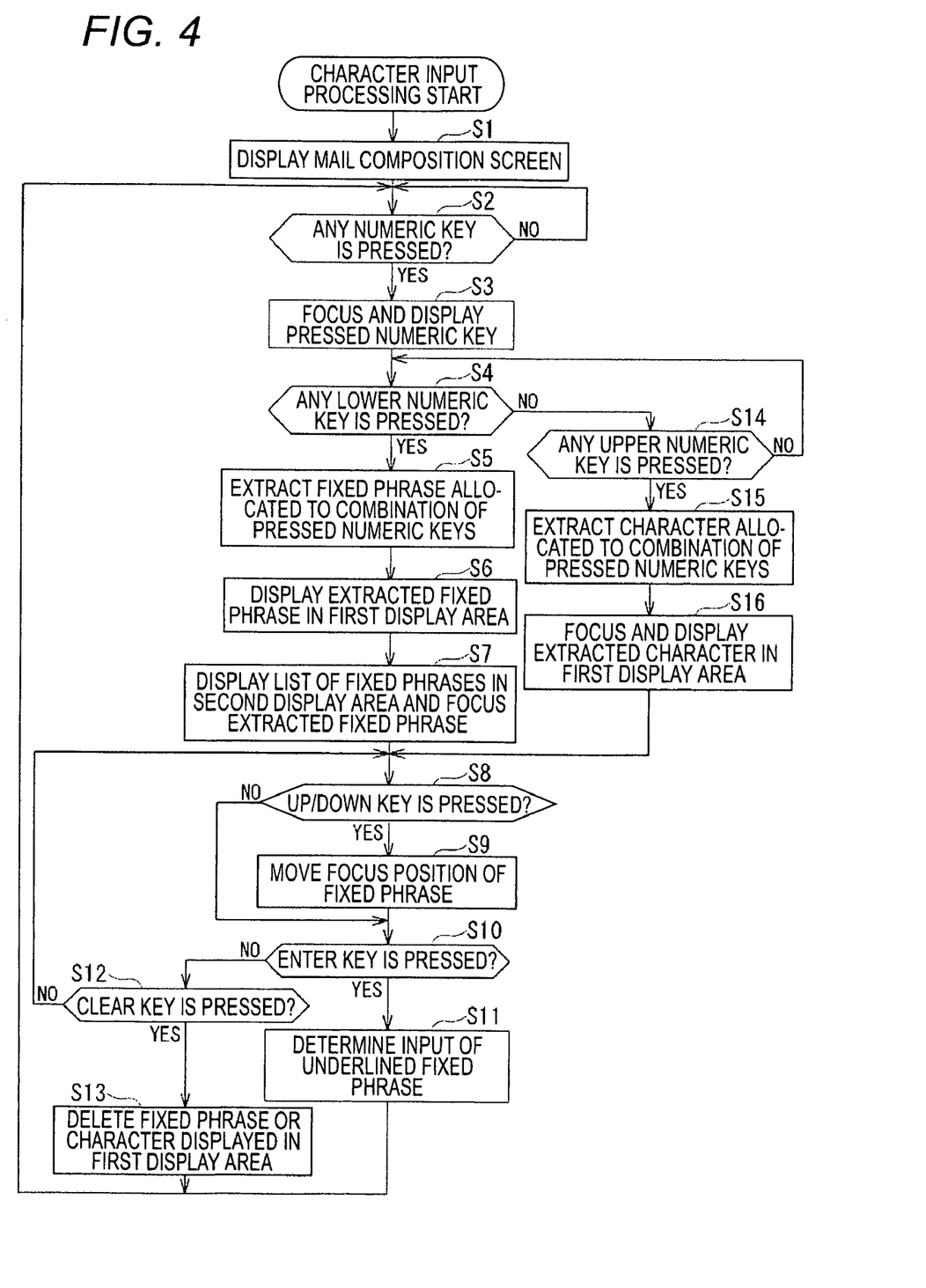
FIG. 4 is an exemplary flowchart illustrating a character input processing in the mobile phone shown in FIG. 3.
Figure 5:
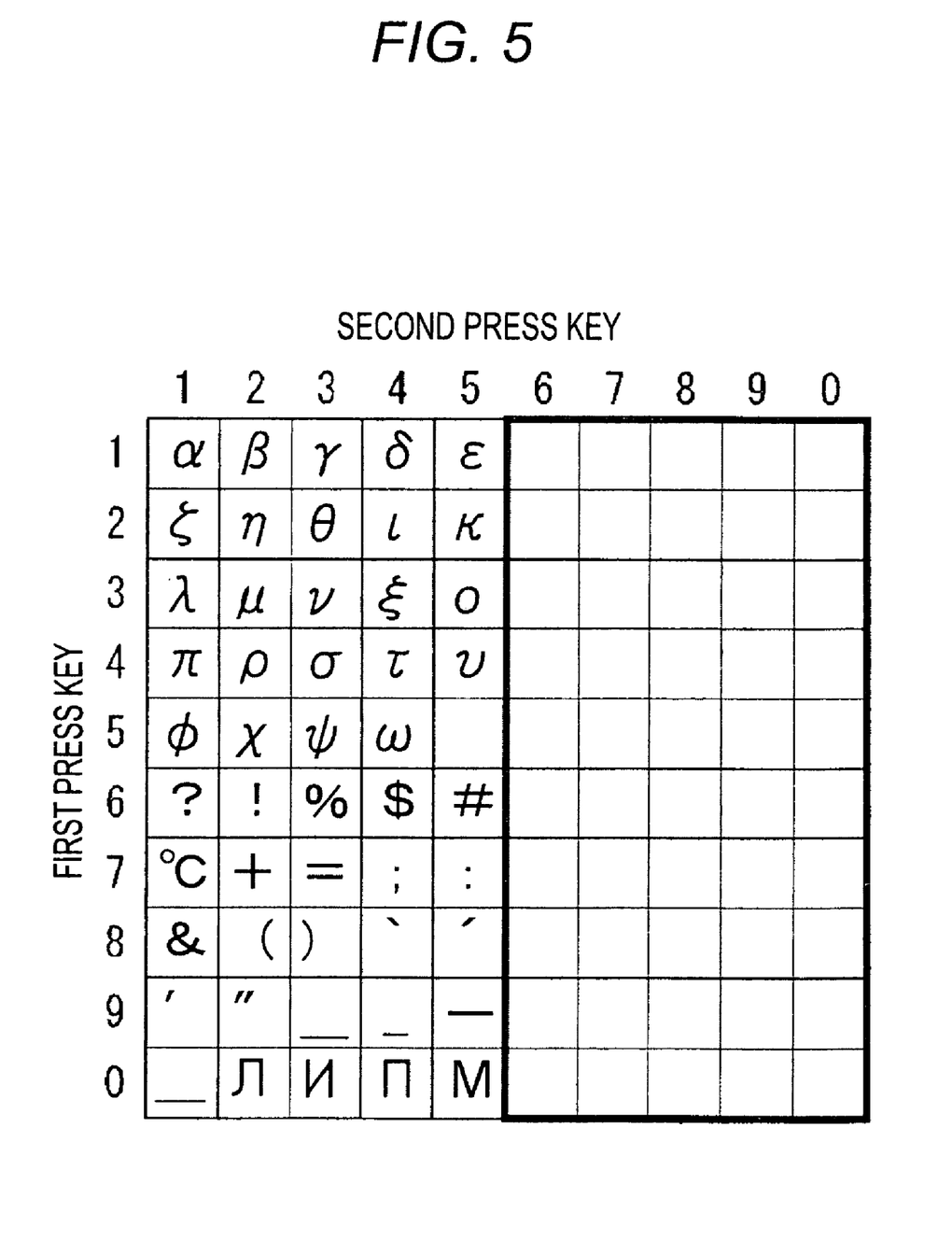
FIG. 5 is an exemplary diagram showing a configuration of a character/symbol/character string correspondence table stored in a storage unit shown in FIG. 3.

A character input processing in the mobile phone 1 of FIG. 3 will be described with reference to a flowchart of FIG. 4. In the character input processing, for example, it is assumed that a mail application is run to compose a mail. However, the invention is not limited thereto, the invention may be applied to other cases in which character input is performed (for example, a memo pad). Prior to describing the character input processing of the invention, the concept of the embodiment will be described. For example, two-touch input is performed by pressing a first key pressed at first and a second key pressed subsequent to the first key. Special characters (characters other than alphabets) or symbols are uniquely allocated to one of combinations of the first key and the second key. For example, as shown in FIG. 5, when the first press key is "1" and the second press key is "1", "$\alpha$" is allocated as a character for two-touch input. When the first press key is "1" and the second press key is "2", "$\beta$" is allocated as a character for two-touch input. The same is applied to the following description.

Figure 6:
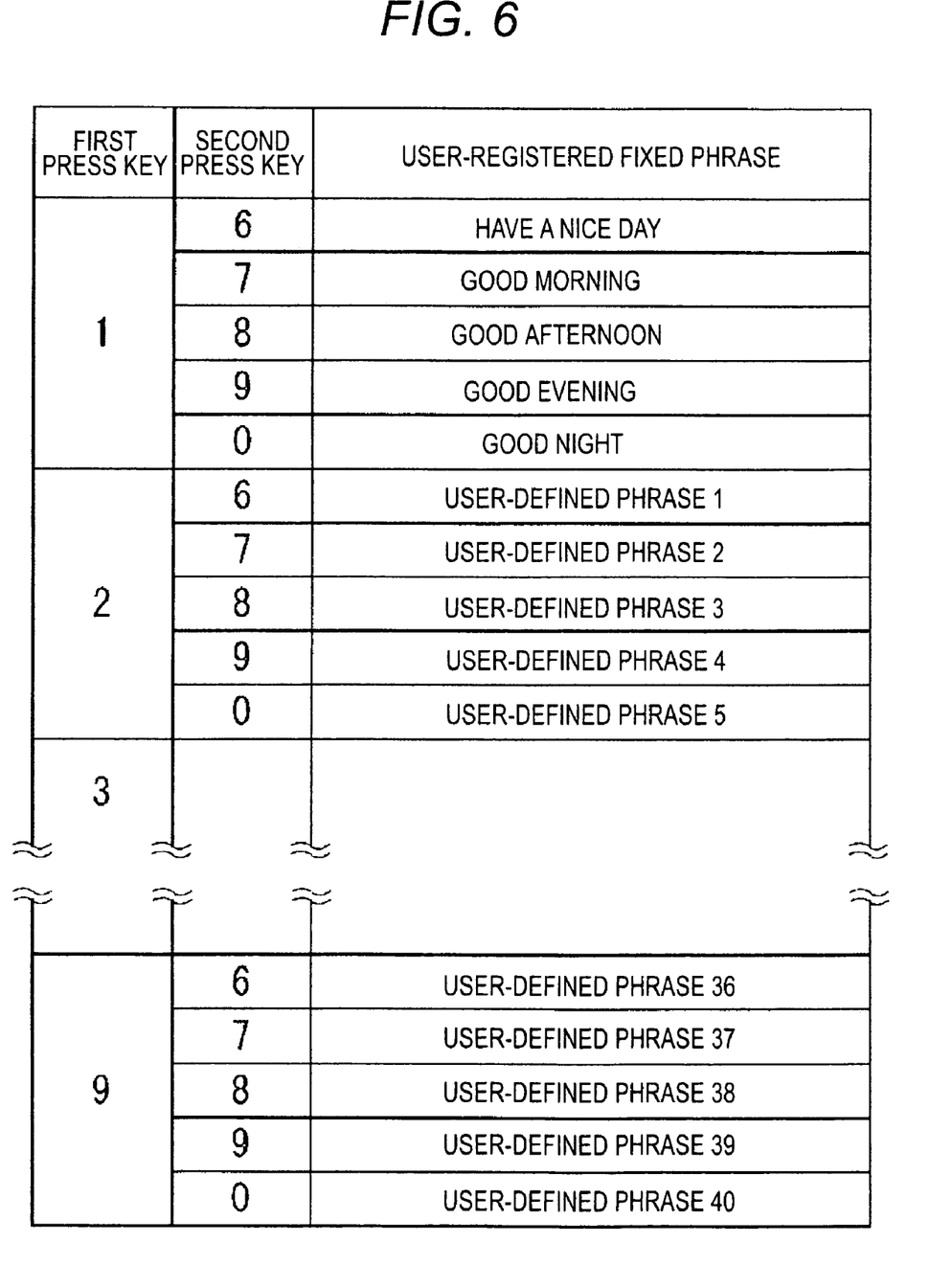
FIG. 6 is an exemplary diagram showing user-defined phrases that are registered in the character/symbol/character string correspondence table stored in a storage unit shown in FIG. 3.

The number of combinations of the first press key and the second press key using the numeric keys of "0" to "9" is 10×10=100. Even though 50 combinations (for example, combinations of the first press key "0" to "9" and the second press key "1" to "5") from among the 100 combinations are allocated to the special characters or symbols, other 50 combinations are not used. In order to achieve fast input of a character string having a plurality of components, such as characters or symbols, the unused areas (for example, combinations of the first press key "0" to "9" and the second press key "0" and "6" to "9") are set as a fixed phrase allocation area. For example, as shown in FIG. 6, when the first press key is "1" and the second press key is "6", "Have a nice day" is allocated as a character string for two-touch input, that is, a fixed phrase. When the first press key is "1" and the second press key is "7", "Good morning" is allocated as a fixed phrase for two-touch input. The same is applied to the following description. To the combinations of the first press key "2" to "9" and the second press key "0" and "6" to "9", user-defined phrases (user-defined phrases 1 to 40), which are registered by the user, are allocated. Of course, various fixed phrases may be allocated beforehand as the default. In addition, characters or character strings may be associated with combinations of symbols other than the numeric keys.

The correspondence shown in FIGS. 5 and 6 is stored in advance in a storage area of the storage unit 42 as a character/symbol/character string correspondence table.

Figure 7:
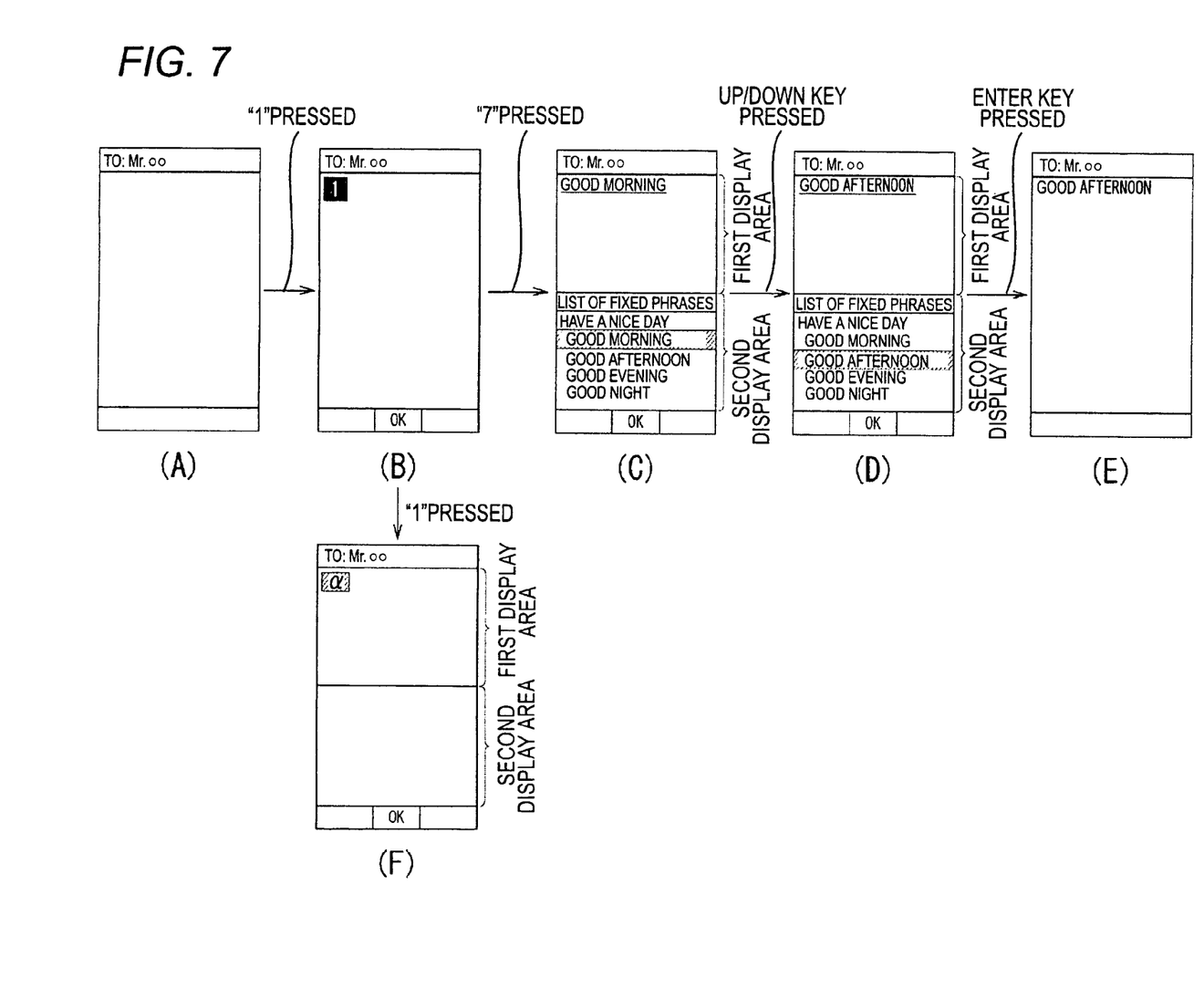
FIG. 7 shows exemplary transition diagrams of a display screen of a main display in the character input processing shown in FIG. 4.

In Step S1, the control unit 41 controls the main display 17 to display a mail composition screen for compositing a mail. The main display 17 displays the mail composition screen, as shown in FIG. 7, section (A), under the control of the control unit 41. In FIG. 7, sections (A) to (F) are transition diagrams of a display screen displayed on the main display 17.

In Step S2, the control unit 41 determines whether or not the user presses a numeric key from among the operating keys 14, and waits for until a numeric key is pressed. If in Step S2 the control unit 41 determines that a numeric key is pressed, in Step S3, the control unit 41 controls the main display 17 to focus and display (highlight) the pressed numeric key. For example, when the user presses the numeric key "1" from among the operating keys 14, the display screen displayed on the main display 17 is changed from the display screen shown in FIG. 7, section (A) to the display screen shown in FIG. 7, section (B), and as shown in FIG. 7, section (B), the numeral "1" is highlighted on the main display 17.

In Step S4, the control unit 41 determines whether or not the user presses a lower numeric key ("0" and "6" to "9") from among the operating keys 14. In Step S4, if the control unit 41 determines that a lower numeric key is pressed, the control unit 41 reads out the character/symbol/character string correspondence table stored in the storage unit 42, and extracts a fixed phrase allocated to a combination of the pressed numeric keys in reference to the character/symbol/character string correspondence table. For example, if the numeric key "1" is pressed and subsequently the numeric key "7" is pressed, "Good morning" is extracted as a fixed phrase allocated to a combination of the pressed numeric keys (a combination of the numeric keys "1" and "7").

In Step S6, the control unit 41 controls the main display 17 to display the extracted fixed phrase in a first display area from among display areas of the main display 17. For example, when "Good morning" is extracted as a fixed phrase, the display screen displayed on the main display 17 is changed from the display screen shown in FIG. 7, section (B), to the display screen shown in FIG. 7, section (C), and as shown in FIG. 7, section (C), the fixed phrase "Good morning" is displayed on the main display 17 while being underlined. The fixed phrases displayed in the first display area may be highlighted (or grayed out).

In addition, in Step S7, the control unit 41 controls the main display 17 to display a list of fixed phrases described in the character/symbol/character string correspondence table, and focuses (highlights) the extracted fixed phrase. Of course, the extracted fixed phrase may be grayed out. For example, when the fixed phrase "Good morning" is extracted, as shown in FIG. 7, section (C), a list of fixed phrases ("Have a nice day", "Good morning", "Good afternoon", "Good evening", and "Good night") allocated to the pressed numeric key "1" (first press key) is displayed in a second display area from among the display areas of the main display 17 according to a predetermined sequence. At this time, a portion corresponding to the extracted fixed phrase "Good morning" is highlighted. Therefore, the user can see a list of selectable fixed phrases even if he/she cannot remember how the fixed phrases are allocated to the combinations of the numeric keys. As a result of that, this prevents us from incorrectly inputting character strings in the two-touch input mode.

In Step S8, the control unit 41 determines whether or not the user presses the up/down key from among the operating keys 14. If in Step S8, the control unit 41 determines that the up/down key is pressed, in Step S9, the control unit 41 controls the main display 17 to move the focus position of a fixed phrase from a list of fixed phrases displayed in the second display area according to an instruction by the press operation of the up/down key.

For example, as shown in FIG. 7, when the display screen shown in FIG. 7, section (C), is displayed on the main display 17, if the user presses the down key from among the operating keys 14, the display screen is changed from the display screen shown in FIG. 7, section (C), to the display screen shown in FIG. 7, section (D). The focus position (position of highlight display) of a fixed phrase from a list of fixed phrases displayed in the second display area is changed from "Good morning" to "Good afternoon". Simultaneously, the fixed phrase displayed in the first display area is changed from "Good morning" to "Good afternoon".

Thereafter, if the user repeatedly presses the up/down key from among the operating keys 14, the focus position of the fixed phrase in the second display area is changed depending on the presses of the up/down key, and the fixed phrase displayed in the first display area is also changed.

If in Step S8, the control unit 41 determines that the up/down key is not pressed, Step S9 is skipped. In Step S10, the control unit 41 determines whether or not the user presses the enter key from among the operating keys 14. If in Step S10, the control unit 41 determines that the user presses the enter key from among the operating keys 14, the control unit 41 recognizes that the user inputs an instruction to determine an undetermined fixed phrase currently displayed in the first display area, and controls the main display 17 to determine the underlined fixed phrase displayed in the first display area. For example, when the enter key is pressed on the display screen shown in FIG. 7, section (D), an undetermined fixed phrase "Good afternoon" displayed in the first display area is determined, and the display screen is changed from the display screen shown in FIG. 7, section (D), to the display screen shown in FIG. 7, section (E). Thereafter, the process returns to Step S2, and Step S2 and later are repeatedly performed.

Meanwhile, if in Step S10, the control unit 41 determines that the user does not press the enter key from among the operating keys 14, in Step S12, the control unit 41 determines whether or not the user presses the clear key from among the operating keys 14. If in Step S12, the control unit 41 determines that the user does not presses the clear key from among the operating keys 14, the process returns to Step S8, and Step S8 and later are repeatedly performed, such that the undetermined fixed phrase displayed in the first display area of main display 17 is determined or cleared.

Meanwhile, if in Step S12, the control unit 41 determines that the user presses the clear key from among the operating keys 14, in Step S13, the control unit 41 controls the main display 17 to delete the fixed phrase (undetermined fixed phrase) displayed in the first display area of the main display 17. Then, the display screen displayed on the main display 17 is changed from the display screen shown in FIG. 7, section (E), to the display screen shown in FIG. 7, section (A). Thereafter, the process returns to Step S2, and Step S2 and later are repeatedly performed.

If in Step S4, the control unit 41 determines that a lower numeric key is not pressed, in Step S14, the control unit 41 determines whether or not the user presses an upper numeric key ("1" to "5") from among the operating keys 14. If in Step S14, the control unit 41 determines that an upper numeric key is not pressed, the process returns to Step S4, and Step S4 and later are performed again.

Meanwhile, if in Step S14, the control unit 41 determines that an upper numeric key is pressed, in Step S15, the control unit 41 reads out the character/symbol/character string correspondence table stored in the storage unit 42, and extracts a character allocated to a combination of the pressed numeric keys with reference to the character/symbol/character string correspondence table. For example, when the numeric key "1" is pressed and subsequently the numeric key "1" is pressed, "α" is extracted as a character allocated to a combination of the pressed numeric keys (a combination of the numeric keys "1" and "1").

In Step S16, the control unit 41 controls the main display 17 to focus and display the extracted character in the first display area from among the display areas of the main display 17. For example, when "α" is extracted as a character, the display screen displayed on the main display 17 is changed from the display screen shown in FIG. 7, section (B), to the display screen shown in FIG. 7, section (F), and as shown in FIG. 7, section (F), the character "α" is focused and displayed on the main display 17.

According to the embodiment the invention, a plurality of operating keys 14 for input in a two-touch input mode are provided, and a character/symbol/character string correspondence table, in which a character, a symbol or a character string as a fixed phrase is allocated in advance to each of combinations of numerals or symbols corresponding to the operating keys 14 to be pressed, is stored. An input character, symbol or character string can be extracted based on numerals or symbols by a first press and a second press in the two-touch input mode with reference to the character/symbol/character string correspondence table, and the extracted character or character string can be displayed in a first display area. Therefore, when a character string is input in the two-touch input mode, unlike the toggle input, a large number of presses of keys are not needed, and thus fast input of a character string having a plurality of components, such as characters or symbols. As a result, operationality and convenience for the character input can be improved.

Although in the embodiment of the invention, fast input of a character string as a fixed phrase has been described, the invention is not limited thereto. For example, if a mail address is registered as a user-defined phrase, fast input of a mail address can be achieved. In addition, a copied and pasted character string on an editor screen may be automatically registered as a user-defined phrase.

The invention may be applied to, in addition to the mobile phone 1, other information processing apparatuses, such as a Personal Digital Assistant (PDA), a personal computer, a portable game machine, a portable music player, and a portable motion image player.

A series of processing described in the embodiment of the invention may be performed by software or may be performed by hardware.

Although in the embodiment of the invention, an example where the steps in the flowchart are performed in time series according to the described sequence has been described, the steps may be not necessarily performed in time series. For example, the steps may be performed in parallel or individually.

What is claimed is:

1. A mobile apparatus comprising:
   an input module including a plurality of operating keys;
   a storage module configured to store a correspondence between a combination of a first operation and a second operation and a corresponding character, the second operation being an operation subsequent to the first operation, the first operation being an operation at a first operating key from among the plurality of operating keys, the second operation being an operation at a second operating key from among the plurality of operating keys;
   an extraction module configured to extract the character to be input, based on operations at the input module referring to the correspondence; and
   a display module including a first display area and a second display area, the second display area being different from the first display area, the display module being configured to display the character extracted by the extraction module in the first display area,
   wherein a combination of the first operating key and the second operating key specifies a position in a matrix whose row and column positions are defined by two respective keys and whose matrix element assigned to each position is stored in the storage module, each position in a first area of the matrix has a single character or symbol assigned thereto as a matrix element, each position in a second area of the matrix has a character string assigned thereto as a matrix element, the character string is a matrix element that is a phrase inclusive of one or more words, the character extracted by the extraction module is either a single character or symbol or a character string that is a matrix element stored in the storage unit and assigned to the specified position in the matrix, and the display module is configured to display, in the second display area, a plurality of character strings assigned to the second area of the matrix.

2. The mobile apparatus of claim 1, wherein the display module is configured to highlight a same character string from among the plurality of character strings displayed in the second display area as the character string displayed in the first display area.

3. The mobile apparatus of claim 1, wherein the plurality of operating keys include an enter key, the mobile apparatus further comprising:
   a determination module configured to enter the character displayed in the first display area when the enter key is operated.

4. The mobile apparatus of claim 1, wherein the display module is configured to highlight or underline the character extracted by the extraction module in the first display area.

5. A mobile apparatus comprising:
   an input module including a plurality of operating keys;
   a storage module configured to store a combination of a first operation and a second operation and a corresponding character, symbol, or character string as a fixed phrase, the second operation being an operation subsequent to the first operation, the first operation being an operation at a first operating key from among the plurality of operating keys, the second operation being an operation at a second operating key from among the plurality of operating keys, the correspondence including a correspondence between the first operating key and a plurality of character strings;
   an extraction module configured to extract the character, symbol, or character string, based on operations at the input module referring to the correspondence; and
   a display module including a first display area and a second display area different from the first display area and configured to display the plurality of character strings in the second display area,
   wherein the display module is configured to highlight a character string from among the plurality of character strings in the second display area and to shift the focus in a direction according to a directing operation at the input module,
   wherein a combination of the first operating key and the second operating key specifies a position in a matrix whose row and column positions are defined by two respective keys and whose matrix element assigned to each position is stored in the storage module, each position in a first area of the matrix having a single character or symbol assigned thereto as a matrix element, each position in a second area of the matrix having a character string assigned thereto as a matrix element, the character string being a matrix element that is a phrase inclusive of one or more words, and the character extracted by the extraction module being either a single character or symbol or a character string that is a matrix element stored in the storage unit and assigned to the specified position in the matrix, and
   wherein the display module is configured to display, in the second display area, a plurality of character strings assigned to the second area of the matrix.

* * * * *